United States Patent
Hayner

[11] 3,899,002
[45] Aug. 12, 1975

[54] OPEN CENTER, PRESSURE DEMAND FLOW CONTROL VALVE

[75] Inventor: Paul F. Hayner, Gilford, N.H.

[73] Assignee: Sanders Associates, Inc., Nashua, N.H.

[22] Filed: Oct. 18, 1973

[21] Appl. No.: 407,746

[52] U.S. Cl............................. 137/625.62; 137/85
[51] Int. Cl........................................... F16k 31/363
[58] Field of Search...... 137/625.62, 625.61, 625.64, 137/625.63, 625.68, 625.6, 596.14, 596.15, 596.16, 85, 101.19, 116.3, 116.5, 117

[56] References Cited
UNITED STATES PATENTS

| | | | |
|---|---|---|---|
| 2,445,544 | 7/1948 | Trautman | 137/117 |
| 2,781,049 | 2/1957 | Binford et al. | 137/117 |
| 2,789,576 | 4/1957 | Mitchell | 137/117 X |
| 2,962,002 | 11/1960 | Hayner | 137/85 X |
| 2,984,251 | 5/1961 | Quinby | 137/116.3 |
| 3,009,447 | 11/1961 | Lloyd | 137/625.62 X |
| 3,223,104 | 12/1965 | Cox et al. | 137/625.62 X |
| 3,774,629 | 11/1973 | Enomoto | 137/116.3 |

*Primary Examiner*—Martin P. Schwadron
*Assistant Examiner*—Robert J. Miller
*Attorney, Agent, or Firm*—Louis Etlinger

[57] ABSTRACT

An open center cylinder and piston flow control valve is described in which the fluid which is delivered to the valve at a constant rate is variably divided between the useful load and the fluid return. The rate of flow is controlled in accordance with an input signal with the aid of a flow sensing orifice in the return line, rather than in the load line, the pressure drop across which is utilized as a feedback signal. One embodiment is a dump valve in which fluid flows through the valve to the load but not back again, the excess fluid from the load being delivered to the return externally of the valve. Another embodiment is a four way valve in which the piston is formed with a central bore and in which all of the fluid flowing to the return flows through the central bore in which are located two flow sensing orifices.

24 Claims, 8 Drawing Figures

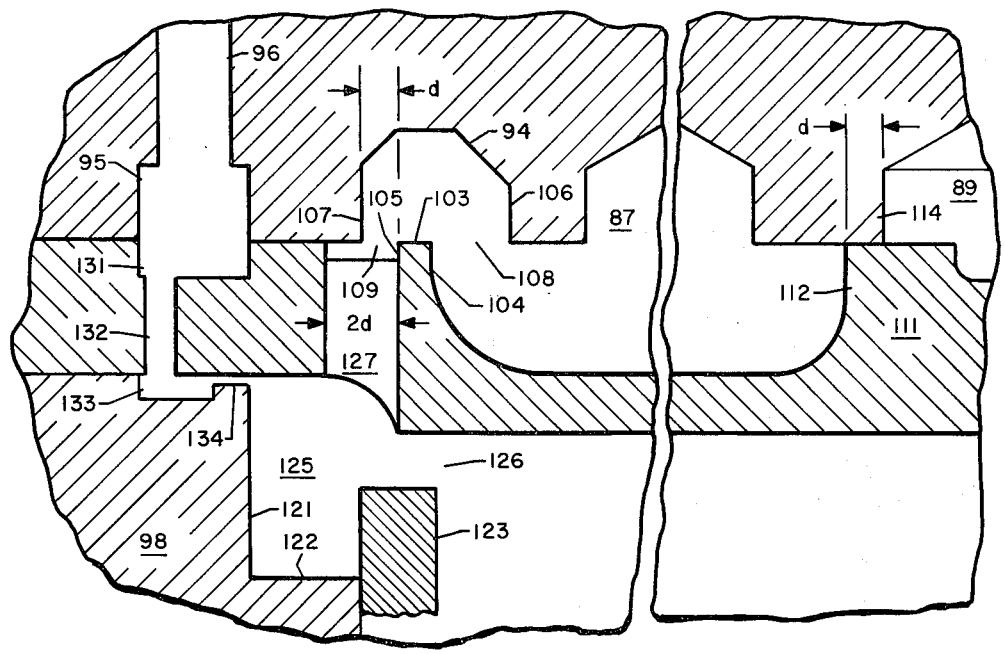
FIG. 5
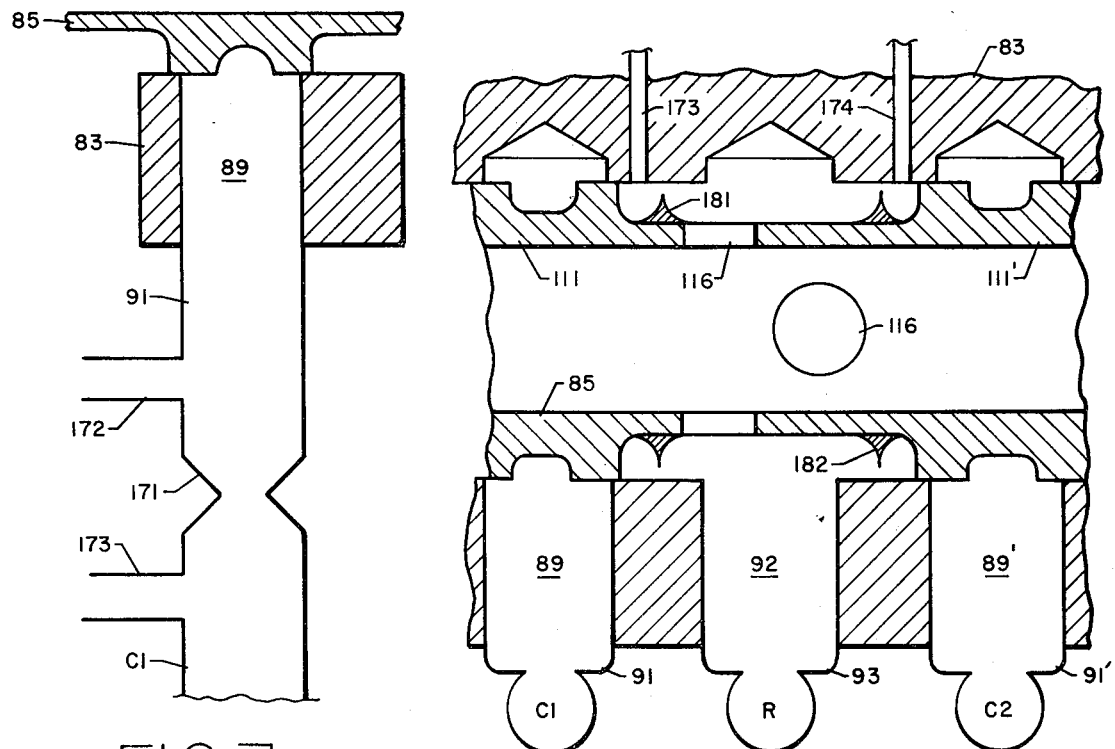
FIG. 7
FIG. 8

OPEN CENTER, PRESSURE DEMAND FLOW CONTROL VALVE

FIELD OF THE INVENTION

This invention relates generally to valve systems for controlling the rate of flow of fluid to a load in response to an input signal and particularly to such systems in which the rate of flow of fluid can be controlled accurately over a large dynamic range.

BACKGROUND OF THE INVENTION

Many practical applications require a valve system for controlling the rate of flow of fluid to a load in response to an input signal. Various valve systems of this general kind have been used in the past. One kind of system is that of U.S. Pat. No. 3,561,488 in which an input signal establishes a rate of flow of a control fluid and the system constrains the main fluid to flow at a rate proportional thereto. Other systems have been used which measure the actual rate of flow of fluid to the load and generate a signal indicative thereof which is fed back to the source of fluid so as to control it to make the actual rate of flow equal to the desired rate of flow. One of the simplest and most common ways to measure the flow is to insert an orifice in the load line and measure the pressure drop thereacross. Such pressure drop, which is indicative of the rate of flow, can then be fed back to the source. Although systems using simple orifices to measure rate of flow have been found satisfactory for many purposes, they are subject to the limitation that the accuracy of control deteriorates rapidly at low rates of flow. This is because the pressure drop across a simple orifice is proportional to the square of the rate of flow therethrough which means that at low rates of flow a given change in flow produces a smaller change in pressure drop than the same change in flow procedures at high rates of flow. This in turn means that at low rates of flow control is difficult to achieve. It would be helpful if the relation between the pressure drop and rate of flow were linear or even nonlinear in the opposite direction so that a given change in rate of flow would produce a larger change in pressure drop at low rates of flow than at high rates of flow. Although various arrangements have been proposed in the past for achieving such a relationship, as far as Applicant is aware all of such proposed arrangements have been either very complicated or unsatisfactory in operation or both.

Another limitation of many prior art flow control valves known to Applicant is that they have required a continuous supply of fluid under maximum pressure even when standing by awaiting a direction to move the load. This in turn has required a pump sized for peak, continuous power and which, although perhaps not operating continuously, has always operated at substantially full load and never idled. Such an arrangement is wasteful of power and generates a lot of heat which, in many cases, must be dissipated in special cooling systems. It might be thought at first glance that a simple open center valve would solve these problems but it has been found that such valves become quite complex when it is necessary to make provision for holding the load in a locked condition when the valve is in its neutral position and at the same time making provision for controlling the rate of flow accurately over a wide dynamic range.

It is a general object of the present invention to provide an improved valve system for controlling the flow of fluid to a load in response to an input signal.

SUMMARY OF THE INVENTION

A valve system incorporating the present invention variably divides the flow of a fluid flowing at a known constant rate between a first branch connected to the fluid return and a second branch connected to the useful load. Thus, when no flow of fluid to the load is required, a high pressure need not be maintained and little power is wasted. In order to control the rate of flow, the actual rate of flow is measured by the pressure drop across a flow sensing restrictor in the return line, rather than in the load line, and this pressure drop is used as a feedback signal to make the rate of flow of fluid to the load equal to that dictated by the input signal. This arrangement provides relatively large changes in feedback signal at low rates of flow to the load, where control has hitherto been difficult, thereby providing accurate control over a wide dynamic range.

BRIEF DESCRIPTION OF THE DRAWINGS

For a clearer understanding of the invention, reference may be made to the following detailed description and the accompanying drawing in which:

FIG. 5 is a fragmentary schematic cross-section diagram to an enlarged scale illustrating a portion of the apparatus shown in FIG. 4;

FIG. 7 is a fragmentary cross-section diagram illustrating a modification of the apparatus of FIG. 4; and FIG. 8 is a fragmentary schematic cross-section diagram illustrating another modification of the apparatus of FIG. 4.

DESCRIPTION OF PREFERRED EMBODIMENT

Figure 1:
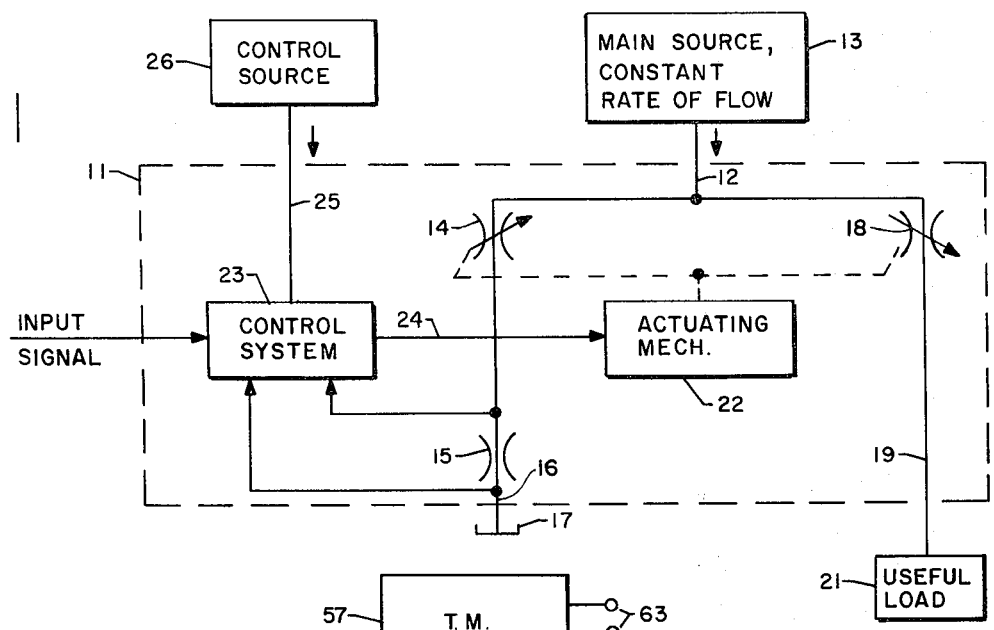
FIG. 1 is a schematic diagram illustrating a valve system incorporating the invention.

Referring first to FIG. 1, there is shown schematically a valve system 11 incorporating the present invention. This valve system includes an inlet connection 12 which, during operation, is intended to be connected to a main source of fluid 13 which provides fluid flowing at a predetermined constant rate. Such a source may, for example, comprise a constant displacement pump. A first branch circuit comprises a variable orifice 14 and a fixed flow sensing restrictor 15 serially connected between the inlet connection 12 and a fluid return connection 16. It is contemplated that the latter connection will be connected to the fluid return, or tank, 17. A second branch circuit comprises another variable orifice 18 which is connected between the inlet connection 12 and an outlet connection 19. It is contemplated that the outlet connection 19 will be connected to a useful load device 21, such as a hydraulic motor. The orifices 14 and 18 are mechanically connected to an actuating mechanism 22 in such a way that the sizes of the two orifices are varied simultaneously and in opposite directions. That is, when one of the orifices is varied, or adjusted, in such a direction as to make the opening larger, the other orifice is varied simultaneously in such a direction as to make its opening smaller. In other words, assuming the orifices are intermediate their extreme positions operation of the actuating mechanism 22 further opens one of the orifices while it simultaneously further closes the other one.

An input signal indicative of the desired rate of flow of fluid to the outlet connection 19 is applied to a control system 23 which also receives signals indicative of the pressure existing on opposite sides of the flow sensing restrictor 15. The latter signals together constitute a measure of the rate of flow of fluid through this restrictor. As will be more fully explained, these latter signals are also indicative of the rate of flow of fluid to the outlet connection 19. If the flow of fluid to the outlet connection 19 is not identical to that dictated by the input signal, the control system 23 generates a control signal which is transmitted over a control signal path 24 to the actuating mechanism 22. The signal path 24 may take many forms such as a mechanical connection or an electrical connection but at present it is preferred that it comprise one or more hydraulic lines. In any event, the signal on the path 24 controls the actuating mechanism 22 so as to vary the sizes of the orifices 14 and 18 simultaneously in the proper sense to make the flow of fluid to the outlet connection 19 equal that dictated by the input signal. In order to generate hydraulic signals, the control system 23 is connected to a source of fluid, either by way of an auxiliary inlet connection 25 adapted to be connected to a control source 26 or, in some cases, the supply may be taken from the inlet connection 12.

In order to obtain accurate control of the rate of flow over a wide dynamic range, it is necessary to pay particular attention to low rates of flow, that is, rates of flow of less than 10 percent of full rated flow. This is because the pressure drop developed across a simple orifice varies with the rate of flow therethrough in such a way that a unit change in flow occurring in the lower range produces much less variation in pressure drop than does the same change in flow in the higher ranges. The flow through a simple orifice can be expressed by the following equation.

$$Q = K \sqrt{\Delta P} \tag{I}$$

where $Q$ equals the rate of flow and $\Delta P$ equals pressure drop.

This relationship may also be expressed as $$\Delta P = KQ^2 \tag{II}$$

Figure 2:
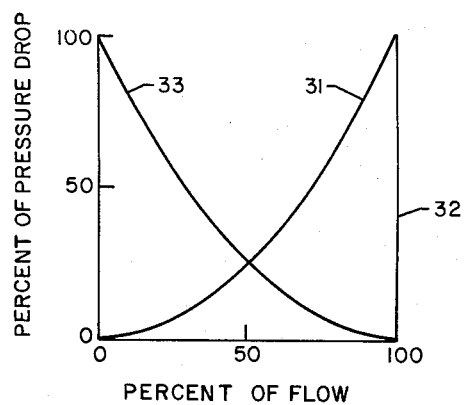
FIG. 2 is a graph useful in explaining the invention.

This relationship is shown graphically in FIG. 2 wherein the curve 31 depicts how the pressure across a simple orifice varies with rate of flow therethrough. It is apparent from the curve that a change in rate of flow of 5 percent occurring near the lower end of the range produces much less change in pressure drop than does a similar change occurring at the upper end of the range. This is why control systems which measure rate of flow by means of a simple orifice in the line whose rate of flow is to be regulated have been found to lose accuracy rapidly as the flow drops below 10 percent or so of full rated flow.

Referring again to FIG. 1, it is apparent that the rate of fluid flowing through the inlet connection 12 is equal to the sum of that flowing through the return connection 16 and the outlet connection 19. In other words, the flow through outlet connection 19 is equal to the flow through inlet connection 12 minus the flow through return connection 16. Assuming, as postulated, that the flow through the inlet connection 12 is a constant known amount, the pressure drop across the flow sensing restrictor 15 is a measure not only of the flow through the return connection 16 but is also a measure of the flow through the outlet connection 19 and therefore can be used to control the rate of flow through this outlet connection 19.

Returning to FIG. 2, the curve 31 represents the rate of flow of fluid through the flow sensing restrictor 15 and the fluid return connection 16. Since the flow through the inlet connection 12 is constant, this flow can be represented by the ordinate 32. The flow through the outlet connection 19 is the difference between the flow through inlet connection 12 and return connection 16 and can be represented by the curve 33. It is apparent from these curves that a high rate of flow through the return connection 16 corresponds to low rates of flow through the outlet connection 19 and accordingly, a given change in flow through the outlet connection 19 which occurs in the low range of rates of flow through this same outlet connection 19 corresponds to a similar change in rate of flow occurring at the high range of flow through the flow sensing restrictor 15 and the return connection 16. This, as previously explained, results in a large change in pressure drop which is now obtained in the low range of rates of flow through the outlet connection 19 where we wish to exercise control. Accordingly, accurate control of very low rates of flow is made possible.

Figure 3:
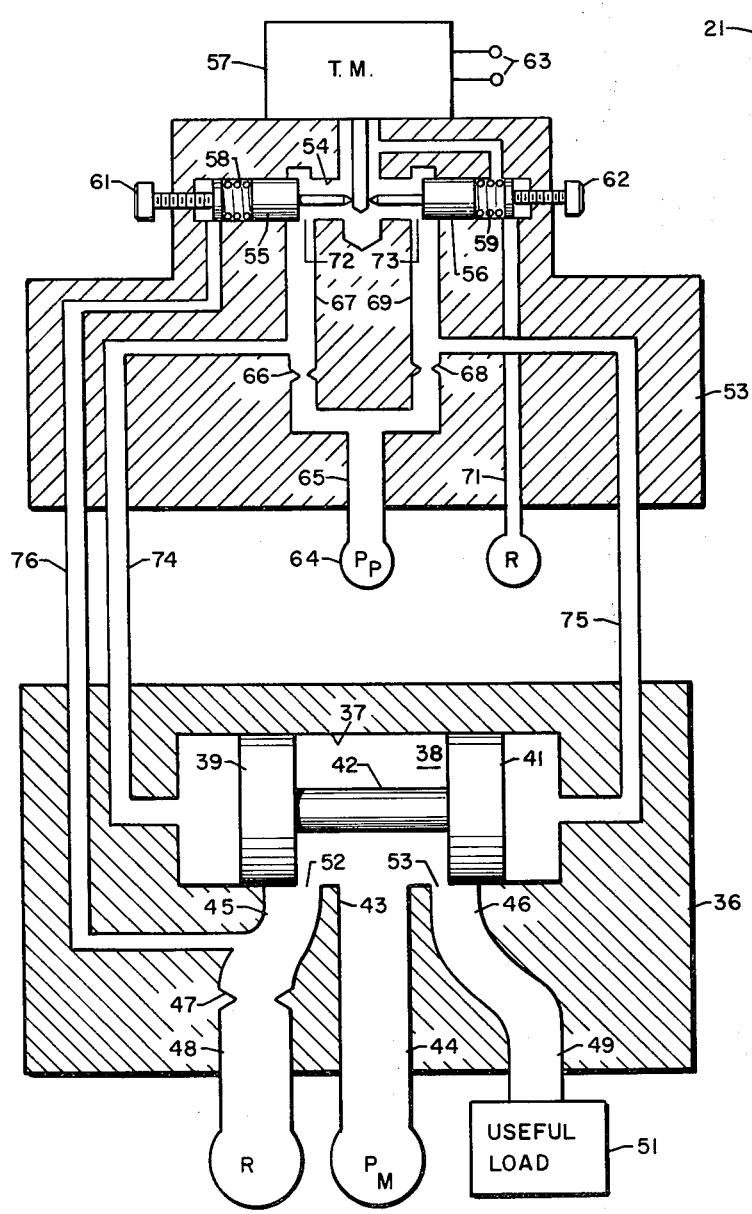
FIG. 3 is a schematic cross-section diagram of a dump valve incorporating the present invention.

Referring now to FIG. 3 there is shown schematically a dump valve system incorporating the present invention. This valve system includes a main housing 36 formed to define a hollow cylinder 37 in which is a single piston indicated generally by the reference character 38 and comprising lands 39 and 41 cooperating with the cylinder 37 and inter connected by a reduced diameter portion 42. The main housing 36 is formed to define a passageway 43 communicating with the cylinder at approximately the midpoint thereof in the region of said reduced diameter portion and hydraulically connected to an inlet connection 44 which, during operation, is intended to be connected to a main source of fluid, designated $P_m$, which supplies fluid at a known predetermined constant rate. The housing 36 is also formed to define passageways 45 and 46 which communicate with the cylinder 37 at opposite sides of the passageway 43. The passageway 45 is hydraulically connected through a flow sensing restrictor 47 to a fluid return connection 48 which is adapted, during operation, to be connected to an external reservoir or tank designated by the reference character "R". The passageway 46 is hydraulically connected to an outlet connection 49 which is intended to be connected to a useful load device 51. The passageway 45 and the land 39 are relatively sized and located to define a variable orifice 52 which controls the flow of fluid from the passageway 43 to the passageway 45. The passageway 46 and the land 41 are similarly relatively sized and located to define a variable orifice 53 which controls the flow of fluid from the passageway 43 to the passageway 46. All of the parts are relatively sized and located so that with the piston 38 centrally positioned within the cylinder 37 as shown in the drawing, the orifices 52 and 53 are both partially opened as shown. The parts are also relatively sized and positioned so that when the piston 38 is shifted sufficiently in either direction, one of the variable orifices is fully closed while the other one is fully opened.

The valve system also includes a pilot housing 53 formed to define a hollow pilot cylinder 54 in opposite ends of which are disposed pilot pistons 55 and 56, respectively. Each of these pistons is formed with an inwardly extending protrusion which protrusions engage opposite sides of the operating arm of a torque motor 57. The pistons 55 and 56 are urged inwardly by springs 58 and 59, respectively, which are disposed in the end spaces in either end of the cylinder and which may be adjusted by means of adjusting screws 61 and 62, respectively. The torque motor 57 urges the pistons to one side or the other in response to an input signal applied to the terminals 63.

A source 64 of pilot pressure is connected to a pilot inlet connection 65 which in turn is connected to two branches, the first of which includes a fixed restrictor 66 and a passageway 67 formed in the housing 53 and communicating with the cylinder 54 while the other branch includes a fixed restrictor 68 and a passageway 69 formed in the housing 53 which also communicates with the interior of the cylinder 54. The interior of the cylinder 54 in the region between the two pistons 55 and 56 is hydraulically connected to a pilot return connection 71 through any convenient path such as by being connected to the end space adjacent to the piston 56 which in turn is connected to the fluid return 71. The pistons 55 and 56 and the passageways 67 and 69 are relatively sized and located so as to define pilot orifices 72 and 73, respectively, which in the central position of the pistons shown in the drawing, are both partially opened so as to provide fluid paths from the passageways 67 and 69, through the orifices 72 and 73 to the fluid return connection. The torque motor 57 urges the pistons 55 and 56 to the right, as viewed in FIG. 3, in accordance with the magnitude of an input signal applied to the terminals 63. Such displacement of the pistons further opens the pilot orifice 73 while at the same time further closing the pilot orifice 72.

The junction between the fixed restrictor 66 and the pilot orifice 72 is connected by means of hydraulic path 74 to the end space in the cylinder 37 which is adjacent to the land 39. Similarly, the junction between the fixed restrictor 68 and the pilot orifice 73 is connected by means of a hydraulic path 75 to the end space in the cylinder 37 which is adjacent to the land 41. The junction between the flow sensing restrictor 47 and the variable orifice 52 is connected by means of a hydraulic path 76 to that end space in the cylinder 54 which is adjacent to the piston 55.

Operation of Dump Valve

Initially the springs 58 and 59 are adjusted so that, with no input signal applied to the torque motor and with no source of fluid applied either to the inlet 44 or the inlet 65, the spring 59 overcomes the spring 58 and displaces the pistons 55 and 56 to the extreme left of the position shown in FIG. 3, with the variable pilot orifice 73 completely closed and the variable pilot orifice 72 completely open. When a source of fluid is applied to the inlet 65, the pressure in the fluid path 75 will be greater than that in the path 74 and the piston 38 will be displaced to the left of the position shown in FIG. 3, with the variable orifice 53 completely closed and the variable orifice 52 completely open. If a source of fluid now be applied to the inlet 44, all of the flow will be through the orifice 52, the restrictor 47 and the inlet 48 back to the return with no fluid flowing to the useful load 51. The flow of fluid through the flow sensing orifice 47 causes a pressure drop across this orifice so that the pressure in the path 76 is greater than the pressure in the return thereby urging the pistons 55 and 56 to the right. The springs 58 and 59, and the internal adjustments of the torque motor 57, are so coordinated that, in the absence of an input signal to the torque motor 57 and with the entire flow from the inlet 44 going to the return, the feedback pressure in the fluid path 76 is just sufficient to center the pistons 55 and 56. Under these conditions, the pressure in the fluid paths 74 and 75 are equal and the piston 38 will stay in its then attained position. When it is desired to supply fluid to the load 51, a suitable signal is applied to the terminals 63 of the torque motor 57 which urges the pistons 55 and 56 to the right. Such movement further closes the pilot orifice 72 and further opens the pilot orifice 73 thereby increasing the pressure in the path 74 over that in the path 75 and urging the piston 38 to the right thereby partially opening the variable orifice 53 and partially closing the variable orifice 52 and allowing some fluid to flow to the load. The partial closing of the orifice 52 reduces the pressure in the fluid path 76 thereby allowing the spring 59 to shift the pistons 55 and 56 to the left. Such shifting continues until the pistons are centered. The valve system becomes stabilized with the pistons 55 and 56 centered and the piston 38 allowing fluid to flow to the load at the rate dictated by the input signal.

Figure 4:
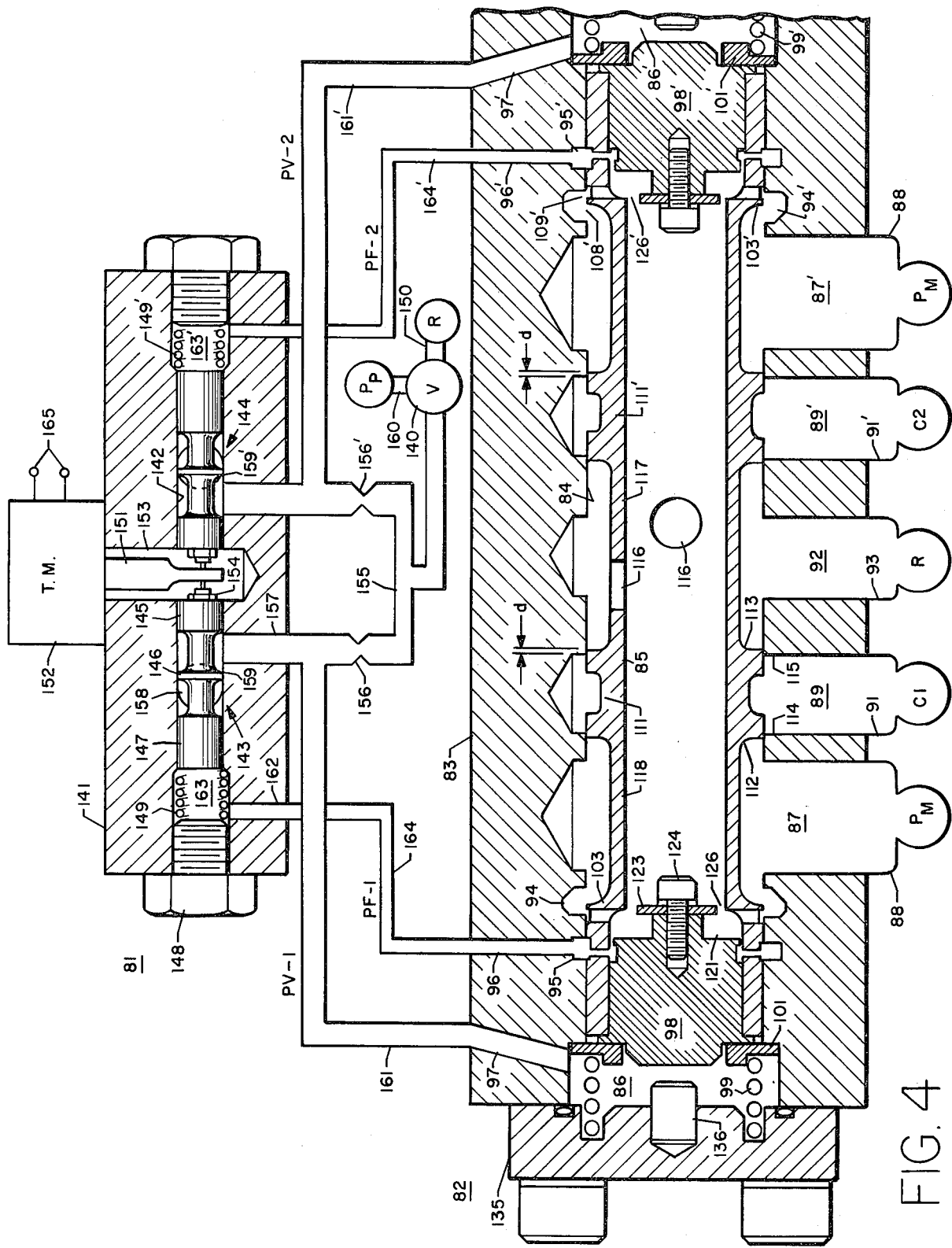
FIG. 4 is a schematic cross-section diagram of a 4-way valve system incorporating the present invention.

Referring now to FIG. 4 there is shown a 4-way valve incorporating the present invention. This valve includes a first stage indicated generally by the reference character 81 and a second stage indicated generally by the reference character 82. The second stage 82 includes a housing 83 formed to define a hollow cylindrical 84. Within the cylinder 84 is a hollow piston 85 which is sufficiently shorter than the cylinder 84 to define end spaces 86 and 86'. The housing 83 is also formed to define two passageways 87 and 87' both communicating with the interior of the cylinder 84 and both communicating with a fluid inlet connection 88. The fluid inlet connection 88, although shown in the drawing as two parts, is really a single connection and, during operation of the system, is intended to be connected to a main source of fluid designated $P_m$ which supplies fluid to the system at a known constant rate. Such a supply may, for example, comprise a constant delivery pump.

The housing 83 is also formed to define a passageway 89 communicating with the interior of the cylinder and with a fluid outlet connection 91 which, during operation of the system, is intended to be connected to a useful load conduit designated C1. The housing 83 is also formed to define another similar passageway 89' which communicates with another fluid outlet connection 91' which during operation is intended to be connected to a second useful load conduit designated C2. The housing 83 is also formed to define a passageway 92 communicating with the cylinder 84 near the center thereof and also communicating with a fluid return connection 93 which is connected to the fluid return, or tank, during operation of the system. The various passageways 87, 89 and 92 can take various forms such as being interior annular grooves cut into the housing 83 but preferably each comprises a drilled hole as shown extending into the cylinder on one side and extending through a short distance on the other side as shown.

The housing 83 is also formed to define annular grooves 94 and 94' which cooperate with small lands formed in the piston as will be more fully explained. Additionally, the housing 83 is formed to define small annular grooves 95 and 95' which communicate with passageways 96 and 96', respectively, leading to the exterior of the housing 83. The housing 83 is also formed to define passageways 97 and 97' communicating with the end spaces 86 and 86', respectively, and each leading to the exterior of the housing 83.

The ends of the hollow pistons 85 are closed by end plugs 98 and 98' which are urged into engagement with opposite ends of the cylinder 85 by springs 99 and 99', respectively, which act between the housing and spring seats 101 and 101' to urge the end plugs 98 and 98' into engagement with the ends of the piston 85 so as to urge it to the central position shown, in the absence of an input signal.

The piston 85 is formed to define two small lands 103 and 103'. As best shown in FIG. 5, the land 103 includes a cut off edge 104 towards the inboard side and a cut off edge 105 towards the outboard side. The groove 94 is formed to define a cut off edge 106 cooperating with the cut off edge 104 and is also formed to define a cut off edge 107 cooperating with the cut off edge 105. It will be understood that the land 103' and the groove 94' are similarly formed. The cut off edges 104 and 106 together define a variable orifice 108, and the cut off edges 105 and 107 define a variable orifice 109. The piston 85 is also formed to define lands 111 and 111' which, in the neutral position shown, occlude passageways 89 and 89', respectively. The land 111 includes cut off edges 112 and 113 and the passageway 89 includes cut off edges 114 and 115. The land 111' and the passageway 89' are similarly formed. When the piston 85 is centrally positioned, as shown in FIGS. 4 and 5, the land 111 overlaps the passageway 89 by a predetermined distance $d$, this distance being the distance between the cut off edges 112 and 114. This is exactly the same as the distance between the cut off edge 105 of the land 103 and the cut off edge 107 of the groove 94 when the piston is centrally positioned. The piston 85 is formed with a series of apertures such as those shown at 116 to provide communication between the hollow interior of the piston 85 and the passageway 92. In this vicinity, the piston has a reduced diameter portion 117 which joins the lands 111 and 111'. Similarly, the piston 85 includes a reduced diameter portion 118 which joins the lands 111 and 103.

The plug 98 is sized and located so that its inboard face 121 is axially spaced from the cut off edge 105 of the land 103. The plug 98 is formed to include an axially extending protrusion 122 to the end of which is fastened a platelike member, or washer, 123 by means of a machine screw 124 threaded into the end of the protrusion 122. The face 121, the protrusion 122, the washer 123, and the piston 85 define a chamber 125. The annular space between the platelike member 123 and the interior surface of the piston 85 defines a flow sensing restrictor 126. The portion of the piston 85 adjacent to the cut off edge 105 is a reduced diameter portion and is formed to include several radially extending apertures such as the aperture 127 shown in FIG. 5 having an axial width of $2d$ and so located that, with the piston 85 centrally positioned as shown in FIGS. 4 and 5, the axial midpoint of the aperture is aligned with the cut off edge 107. As a result, there is fluid communication from the passageway 87, through the variable orifice 108, over the top of the land 103, through the variable orifice 109 through the apertures such as the aperture 127, through the chamber 125 and thence through the flow sensing restrictor 126 to the central bore of the piston 85. As previously mentioned, this bore is further in communication, through the apertures 116, with the passageway 92 and the fluid return connection 93, The piston 85 is also formed to define a passageway 131 preferably in the form of an annular groove and which, with the piston centrally positioned as shown, is approximately aligned with the aperture or groove 95 in the housing 83. The piston 85 also is formed to define a passageway 132 extending radially inwardly from the groove 131 to the interior bore of the piston. The plug 98 is formed to define an annular groove 133 which cooperates with and provides communication with the passageway 132 in the piston 85. The plug 98 is also formed to define a much shallower annular groove 134 which provides a restricted communication between the groove 133 and the chamber 125. As will be more fully explained, the shallow groove 133 constitutes a restrictor which smooths out pressure variations.

The hollow cylinder of the housing 83 is closed by an end cap 135 and the movement of the piston 85 and the plug 98 to the left, as viewed in FIG. 4 is limited by a stop member 136 extending radially inwardly from the end cap 135.

Although many of the parts of the second stage have been described only as they pertain to the left end as viewed in FIG. 4, it will be understood that the construction at the opposite end is mirror image of that described in detail.

The first stage 81 includes a housing 141 formed to define a hollow cylinder 142 in which are disposed two identical pistons indicated generally by the reference characters 143 and 144, only the former of which will be described in detail. The piston 143 includes an inboard land 145, a narrow central land 146, and an outboard land 147. The cylinder 142 is closed by means of a threaded lug 148 and a spring 149 acts between this plug and the land 147 so as to urge the piston inwardly and into engagement with one side of the actuating arm 151 of a torque motor 152. The arm 151 extends into a chamber 153 which is connected to the return and against which the pistons bear on opposite sides. The piston 143 includes an adjusting screw 154 by which the axial position of the piston 143 may be adjusted.

The first stage includes a conduit 155 connected to a valve 140 which in turn is also connected to a fluid return connection 150 and to a pilot inlet connection 160. The latter connection is adapted to be connected to a source of pilot fluid designated $P_p$, which, under some circumstances, may be identical with the main source. The valve 140 has a first position at which the pilot inlet connection 160 is connected to the fluid return connection 150 while the connection to conduit 155 is blocked and a second position at which the pilot inlet connection 160 is connected to the conduit 155 while the fluid return connection 150 is blocked. The conduit 155 is connected through a fixed restrictor 156 to a passageway 157 formed in the housing 141 which passageway communicates with the cylinder 142 in the region between the lands 145 and 146. A passageway 158 is in communication with the fluid return and also is in communication with the hollow cylinder 142 in the region of the narrow land 146. The land 146 and the passageway 158 cooperate to form a pilot orifice 159 for controlling the flow of fluid from the passageway 157 across the land 146 and into the passageway 158 to the fluid return. The parts are preferably sized and located relative to each other so that with the piston 143 in the netural position shown, the pilot orifice 159 is slightly open. This is shown by the dotted line portion of the passageway 158 and the opening has been exaggerated somewhat in the interest of clarity.

The junction of the fixed restrictor 156 and the pilot orifice 159, which occurs in the region of the passageway 157, is connected by menas of a fluid path 161 to the passageway 97 in the first stage, which leads to the end space 86. The housing 141 is also formed to define a passageway 162 communicating with the end space 163 and which is connected to a fluid path 164 which in turn communicates with the passageway 96 in the housing 83. This passageway, as will be more fully explained, provides feedback from the second stage to the first stage.

Operation

Figure 6:
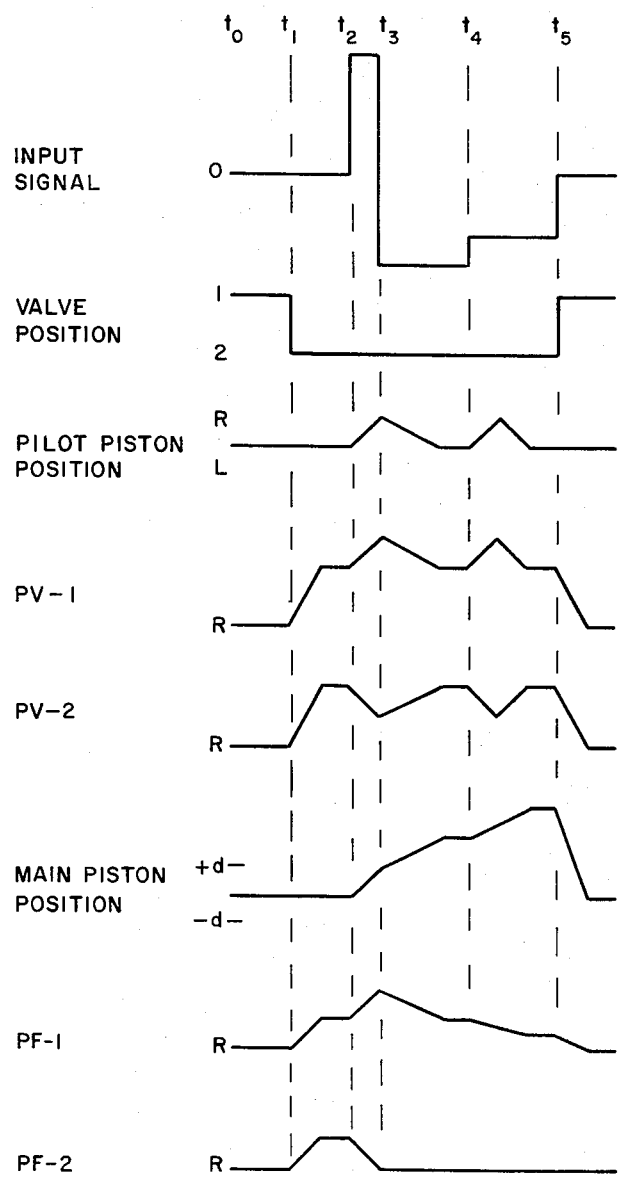
FIG. 6 is a group of graphs useful in explaining the invention.

With the valve 140 in its first position so as to cut off the source of pilot fluid, and in the absence of an input signal to the terminals 165 of the torque motor 152, the parts will be in the positons shown in the drawing and as schematically shown in FIG. 6. The valve 140 is next turned to its second position at time $t_1$, whereupon fluid will flow from the pilot source through the fixed restrictors 156 and 156' and through the pilot orifices 159 and 159' to the return at equal rates. Therefore, the pressures in the fluid paths 161 and 161' and in the end spaces 86 and 86', designated PV-1 and PV-2, will rise to equal values, as shown between the times $t_1$ and $t_2$ of FIG. 6, and the piston 85 will remain stationary. At the same time, fluid from the main source will flow through the inlet connection 88, the passageway 87, through the variable orifice 108, over the land 103, through the variable orifice 109, through the aperture 127 into the chamber 125 and through the flow sensing restrictor 126 to the bore of the cylinder and then through the apertures 116 and the passageway 92 to the fluid return connection 93. As the fluid flows through the flow sensing restrictor 126, it creates a pressure drop thereacross so that the pressure in the chamber 125 is greater than the pressure at the fluid return connection. This pressure is transmitted through the shallow groove 134, which smooths out the high frequency ripples in the pressure, through the groove 133, the passageway 132, the grooves 131 and 95, the passageway 96 and the fluid path 164 to the end space 163 in the first stage 81. This pressure rise is shown by the graph of PF-1 of FIG. 6 and it urges the pistons 143 and 144 to the right. However, at the same time there is an equal flow of fluid from the fluid inlet connection 88 to the passageway 87' and all of the various passageways at the right end of the apparatus as illustrated in FIG. 4 and to the fluid return connection 93. Since the piston 85 is centrally positioned, the pressure drop across the flow sensing restrictor 126' is the same as that across the restrictor 126 with the result that the pressure in the end space 163' of the first stage 81 is equal to that in the end space 163, as shown by the graph of PF-2, and the pistons 143 and 144 remain stationary in the central position illustrated in the drawing.

As previously mentioned, fluid also flows from the inlet connection 160, the valve 140 and the conduit 155 through the flow sensing restrictor 156, the passageway 157 and the variable pilot orifice 159 to the fluid return connection. The pressure existing at the junction of the restrictor 156 and the orifice 159 is conducted by means of the fluid path 161 and the passageway 97 to the end space 86. A similar flow of fluid occurs from the inlet connection 155 through the restrictor 156 and the variable pilot orifice 159' to the fluid return. Similarly, the pressure existing at the junction of the restrictor 156' and the variable orifice 159' is led by means of the flud path 161' and the passageway 97' to the end space 86' of the first stage 82. The first stage is adjusted, by means of the adjusting screws 154 and 154', the springs 149 and 149' and the torque motor 152 so that in the absence of an inupt signal the pressures in the end spaces 86 and 86' are equal. Therefore, the piston 85 remains stationary in the position shown in the drawing. At this time, there is very little opposition to the flow of fluid, the only opposition being the flow sensing restrictors and variable orifices which, at this time, are substantially fully opened. Therefore, the fluid source is not required to work against a large pressure head and accordingly, little power is consumed and little heat is generated. It is also to be noted that in the central position shown, the lands 111 and 111' completely cover the passageways 89 and 89' leading to the outlet connections 91 and 91' so that any useful load, such as a fluid motor, connected to the outlet connections is fluid locked into place.

Let it be assumed that it is now desired to have fluid flow into the outlet connection 91 and the load conduit C1. Obviously, the piston 85 must be displaced to the right. This in turn means that PV-1 must be greater than PV-2 which in turn requires that a signal be applied to the terminal 165 of the torque motor 152 of such sense as to urge the pistons 143 and 144 to the right. As these pistons move to the right, the pilot orifice 159 is made smaller while the pilot orifice 159' is made larger. This has the desired effect of increasing PV-1 while decreasing PV-2 thereby shifting the piston 85 to the right. Let us first consider what happens as the piston 85 is displaced up to the distance d. As best shown in FIG. 5, the variable orifice 108 is decreased in size but since it is still quite large, the more significant effect is the increase in size of the variable orifice 109 which allows more fluid to flow through the flow sensing restrictor 126 thereby increasing the pressure drop thereacross and increasing the feedback pressure, PF1, which is transmitted to the end space 163 of the first stage. At the same time, the variable orifice 109' at the other end of the piston is decreased in size thereby decreasing the flow of fluid through the flow sensing restrictor 126' and decreasing the feedback pressure PF2 applied to the end space 163'. It will be noted that these feedback pressures PF1 and PF2, urge the pistons 143 and 144 to the right which is exactly the same direction as they were originally urged by the input signal. In other words, this amounts to positive feedback. This increase in PF-1 and the decrease in PF-2 is shown in FIG. 6 between the times $t_2$ and $t_3$. If this situation were allowed to continue, that is, with both the input signal and the feedback pressures urging the pilot pistons in the same direction, they would soon move to their extreme positions and would cause the main piston 85 also to move to its extreme position and there would be no control. To correct this situation, the initial input signal is a pulse of the proper sense to move the piston 85 to the right and of such magnitude and duration to carry it a distance just greater than d from the center, that is, just beyond the dead space. The sense of the input signal is then immediately reversed as shown at the time $t_3$ in FIG. 6. The magnitude of this signal of reversed sense is chosen to make the rate of flow to the outlet connection 91 of the desired value.

In FIG. 6, the time at which the input signal is reversed and the time by which the main piston 85 has moved a distance d from center are virtually indistinguishable. It will be understood, however, that, as mentioned above, the piston 85 must have progressed at least slightly beyond the dead space when the input signal is reversed and may, without adverse effects, have progressed well beyond this point. In any event, it is to be noted that, as best shown in FIG. 5, the displacement of the piston 85 to the right by a distance d fully opens the variable orifice 109 by bringing the aperture 127 into full registration with the groove 94. Accordingly, further displacement of the piston to the right cannot increase the flow of fluid through the apertures 127 and the flow sensor 126 and accordingly, the feedback pressure PF-1 cannot increase thereafter. Indeed, as the piston 85 moves further to the right, the variable orifice 108 decreases its size, reducing the flow of fluid through the flow sensing restrictor 126 and reducing the feedback pressure PF-1. In summary, it is to be noted that with the piston 85 centrally located as shown in FIGS. 4 and 5 the feedback pressure has a moderate value. As the piston is displaced to the right up to distance d, the feedback pressure increase. Further displacement of the piston 85 decreases the feedback pressure. At the same time, a similar but opposite sequence of events takes place at the other end of the piston. With the piston 85 centrally positioned, the feedback pressure PF-2 has a moderate value and is equal to that of PF-1. As the piston 85 is displaced to the right, the variable orifice 109' decreases until the distance $d$ is reached at which point it becomes fully closed. As a result, the feedback pressure PF-2 decreases from its former moderate value down to the value of the pressure of the return and further displacement has no further effect, the feedback pressure PF-2 remaining constant and equal to the pressure of the return.

Returning now to the effect of the reversed polarity input signal at time t3, this signal urges the pilot pistons 143 and 144 towards the left against the urging of the feedback pressure PF1. As the pistons move left, the control pressure PVI decreases while the control pressure PV2 increases until they are again equal to each other at which time the main piston will come to rest at a position such as to make feedback pressure PF1 just the right mangitude to balance the input signal so that the pilot pistons 143 and 144 are centered. The way in which this occurs can perhaps better be understood by assuming the parts are in equilibrium as indicated at t4 in FIG. 6 and assuming that it is now desired to increase the flow of fluid through the outlet connection 91 and the load conduit C1. In order to increase the flow, it is necessary to reduce the input signal as shown at t4 in FIG. 6. Since the input signal urges the pilot pistons 143 and 144 to the left, a reduction in this signal allows the feedback pressure PF1 to move these pistons to the right. Such movement increases PV1 and decreases PV2 thereby shifting the pistons 85 to the right. Such shifting further opens the variable orifice formed by the cut off edge 112 on the land 111 and the cut off edge 114 of the passageway 89 allowing more fluid to flow to the outlet. At the same time the varible restrictor 108 is reduced in size thereby reducing the flow of fluid to the flow sensing orifice 126 and reducing the feedback pressure PF1 to exactly balance the new value of input signal whereupon the pistons 143 and 144 are again centered, the control pressures PV1 and PV2 are again equal and the piston 85 comes to rest at the new position.

The magnitude of the flow to the outlet connection 91 is a function of the magnitude of the input signal and is self stabilizing against changes in load pressure. For example, let it be assumed that the apparatus has become stabilized with the input signal of the magnitude indicated between t4 and t5 of FIG. 6. Let it be assumed that at this time the pressure in the load conduit C1 increases. Such increase would tend to reduce the flow of fluid into the passageway 89 between the cut off edges 112 and 114 (FIG. 4). Since the flow to the inlet 88 is a constant amount the flow through the flow sensing orifice 126 necessarily increases. Such increase increases the feedback pressure PF1 thereby shifting the pilot pistons 143 and 144 to the right which in turn, through control pressures PV1 and PV2, shift the piston 85 further to the right thereby increasing the size of the orifice between the cut off edges 112 and 114 and correspondingly, restoring the rate of flow to the outlet connection 91. At the same time, the flow through the flow sensing orifice 126 is reduced until the feedback pressure PF1 is again reduced to the value necessary to balance the input signal and allow the pistons 143 and 144 to return to their central position.

Now let it be assumed that at the time $t5$ it is desired to cut off the flow to the load altogether. This cannot be done merely by a reduction of the input signal to zero because such reduction would cause an increase in the flow.

Accordingly, the input signal is reduced to zero at the same time the valve 140 is actuated to its number one position thereby cutting off the flow of the pilot fluid. This effectively connects the passageways 157 and 157' to the return, through the orifices 159 and 159'. At the same time the control pressures PV1 and PV2 are both reduced to the return pressure and such reduction allows the centering springs 99 and 99' to return the piston 85 to its central position.

As previously noted, in order to displace the piston 85 to the right it was necessary to apply a signal to the torque motor such as to displace the pistons 143 and 144 to the right. This, it will be recalled, resulted in positive feedback through the hydraulic paths 164 and 164'. It might be thought at first glance that the whole thing could be resolved by merely crossing the feedback lines but analysis shows that this is not the case. This is because an increase in the flow of fluid to the load results in a decrease in the feedback signal generated. Therefore, a simple crossing of the feedback lines is not effective because then an increasing signal would only result in a decreasing feedback signal and no balance would result.

The valve system of FIG. 4 has a number of important features. The open center construction allows the source, such as a constant displacement pump, to be unloaded at all times except when flow of fluid to the load is actually required and even then the pump works only against that pressure necessary to overcome the load. The result is that there is very little wasted power and very little excess heat generated. At the same time, the outlet connections, or load conduits, are blocked at the neutral position of the valve so that the load is hydraulically locked into place without the necessity of expending power. Additionally, the rate of flow of fluid to the load is carefully controlled to be that dictated by the input signal regardless of load pressure. Wide dynamic range is achieved by placing the flow sensing restrictor in the return line rather than the load line so that excellent control is obtained at low rates of flow to the load which is the region where good control has heretofore been very difficult.

In some practical application the tight control of the rate of flow at the low ranges is of lesser importance than control at other ranges. In such cases, the complication incident to reversal of the polarity of the input signal can be eliminated while at the same time retaining the other advantages of this valve system. The system need only be modified by the relocation of the flow sensing restrictors and the feedback lines.

Referring now to FIG. 7, there is shown a modification in which the outlet connection 91 is formed to include a fixed flow sensing restrictor 171. Hydraulic paths 172 and 173 are connected to the outlet connection 91 on either side of the restrictor 171 so as to sample the pressure existing on each side of the restrictor and to enable these pressures to be utilized as feedback signals. If the external load device is one in which fluid flows in both directions through the load conduit C1, a single restrictor 171 is a sufficient. There may be some cases in which fluid flows only outward through the load conduits C1 and C2 and it is returned to the sump externally. In such cases, a restrictor may be placed in each of the outlet connections 91 and 91'.

Referring now to FIG. 8 there is shown another embodiment in which an annular restrictor 181 is formed integrally with or fastened to the piston 85 between the land 111 and the apertures 116. This restrictor is to measure the flow of fluid from the passageway 89 to the passageway 92 and the fluid return connection 93 when the piston 85 is displaced to the left of the central position shown in FIG. 8. The element 181 preferably has a sharp periphery so as to act as a sharp edged orifice substantially independent of the temperature of the fluid. A similar flow sensing restrictor 182 is fastened to or formed integrally with the piston 85 between the land 111' and the apertures 116. The housing 83 is formed to define passageways 173 and 174 communicating with the upstream sides of the restrictors 181 and 182, respectively, and which passageways constitute feedback connections.

Although preferred embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. A valve system comprising, a fluid inlet connection, a fluid outlet connection, a fluid return connection, and apparatus for controllng the flow of fluid among said connections, characterized in that said apparatus comprises means for dividing the flow of fluid through said inlet connection so that one part flows through said return connection while the remainder flows through said outlet connection, said means comprising first and second fluid paths, said first path being connected between said inlet connection and said return connection, said second path being connected between said inlet connection and said outlet connection, said paths being independent of each other except for their common connection to said inlet connection, said first path including a first variable orifice and a flow sensing restrictor serially connected so that fluid may flow from said inlet connection, through said first variable orifice then through said restrictor to said return connection, whereby the pressure drop across said restrictor is the difference between the pressure of said return connection and the pressure upstream of said restrictor, said second path including a second variable orifice, a control system jointly responsive to an input signal and the pressure drop across said flow sensing restrictor for generating a control signal, and means responsive to said control signal for varying the sizes of said first and second variable orifice simultaneously in opposite directions.

2. A valve system in accordance with claim 1 in which said control system includes a first valve stage for generating first and second variable fluid control pressures, which pressures jointly constitute said control signal.

3. A valve system in accordance with claim 2 which includes a second valve stage comprising said means responsive, said variable orifices, and said flow sensing restrictor.

4. A valve system in accordance with claim 3 in which said second stage includes a housing formed to define a hollow cylinder and also includes a piston moveable in said cylinder and arranged to be urged in opposite directions by said first and second control pressures and in which said housing and said piston are formed to define said first and second variable orifices.

5. A valve system in accordance with claim 4 in which the length of said piston is less than the length of said cylinder whereby first and second end spaces at opposite ends of said cylinder are defined and which includes first and second hydraulic paths connecting said first and second control fluid pressures to said first and second end spaces respectively.

6. A valve system in accordance with claim 4 in which said piston comprises first and second lands joined by a reduced diameter portion and in which said housing is formed to define a first passageway communicating with said cylinder at approximately the midpoint thereof in the region of said reduced diameter portion and hydraulically connected to said inlet connection and is also formed to define second and third passageways communicating with said cylinder at opposite sides of said first passageway at such positions as to define, with said first and second lands, respectively, said first and second variable orifices, said second passageway being hydraulically connected to said flow sensing restrictor and said third passageway being connected to said outlet connection. j 7. A valve system in accordance with claim 6 in which said lands and said passageways are relatively sized and located so that when said piston is centrally positioned in said cylinder, both of said variable orifices are partially open and so that movement of said piston in one direction further closes said first orifice and further opens said second orifice while movement in the opposite direction further opens said first orifice and further closes said second orifice.

8. A valve system in accordance with claim 4 in which said piston comprises first and second lands joined by a reduced diameter portion, and in which said housing is formed to define a first passageway communicating with said cylinder in the region of said reduced diameter portion and hydraulically connected to said inlet connection, and in which said housing is also formed to define second and third passageways communicating with said cylinder at opposite sides of said first passageway at such locations as to define, with said first and second lands respectively, said first and second variable orifices, and a third variable orifice hydraulically interconnecting said second passageway with said flow sensing restrictor, said third passageway being hydraulically connected to said outlet passageway.

9. A valve system in accordance with claim 8 in which said passageways and said lands are relatively sized and located so that with said piston centrally positioned in said cylinder said second variable orifice is fully closed and said first variable orifice is substantially fully open.

10. A valve system in accordance with claim 9 in which, with said piston centrally positioned in said cylinder, said second land overlaps said third passageway by a predetermined distance on each side.

11. A valve system in accordance with claim 10 in which the width of said second passageway parallel to the cylindrical axis is greater than the width of said first land and is so located that, with said piston centrally positioned in said cylinder, said first land underlaps said second passageway on both sides so that fluid communication is established from said first passageway through said second passageway over said first land to the opposite side of said first land.

12. A valve system in accordance with claim 11 in which said second passageway is formed to define first and second cut off edges at the extremities thereof which are near and remote, respectively, from said first passageway and in which said first land is formed to define first and second cut off edges which cooperate with said first and second cut off edges of said second passageway, respectively and define therewith said first variable orifice and said third variable orifice, respectively, and in which said first land is so located that, with said piston centrally positioned in said cylinder, the distance between said second cut off edges of said first land and said second passageway is substantially equal to said predetermined distance by which said second land overlaps said third passageway.

13. A valve system in accordance with claim 12 in which said piston is formed to define a central bore and is also formed to establish fluid communication between said bore and said third variable orifice, and in which said flow sensing restrictor is located within said bore.

14. A valve system in accordance with claim 13 in which the aforesaid communication between said bore and said third variable orifice includes a plurality of radially extending orifices formed in said piston adjacent to said second cut off edge of said first land and having an axial width substantially equal to twice said predetermined distance.

15. A valve system according to claim 14 in which said housing is formed to define a fourth passageway communicating with said cylinder and displaced from said third passageway to that side which is remote from said first passageway, said fourth passageway being hydraulically connected to said fluid return connection, and in which said piston is formed to define a hydraulic path between said bore and said fourth passageway for all operative positions of said piston.

16. A valve system in accordance with claim 15 in which, with said piston centrally positioned in said cylinder, the distance between said first cut off edge of said first land and said first cut off edge of said second passageway is greater than twice said predetermined distance by which said second land overlaps said third passageway.

17. A valve system according to claim 16 including a generally cylindrical plug closing the outer end of said bore of said cylinder with its inboard face axially spaced from said second cut off edge of said first land, said plug being formed with a protrusion of reduced diameter extending axially inwardly, and including a plate like member having a diameter less than the interior diameter 5 of said bore and fastened to the end of said protrusion, whereby a chamber is defined between said member and said plug which chamber is in communication with said third variable orifice through said plurality of apertures, and whereby the outer edge of said member and the interior surface of said bore define said flow sensing orifice.

18. A valve system in accordance with claim 17 in which said housing is formed to define a fifth passageway axially aligned with a portion of said plug and in which said piston and said plug are formed to define a fluid path providing communication between said chamber and said fifth passageway for all operative positions of said piston.

19. A valve system in accordance with claim 18 in which said fluid path includes a shallow groove in the exterior of said plug constituting a smoothing restrictor.

20. A valve system in accordance with claim 19 including a fluid path from said fifth chamber to said first valve stage for transmitting the pressure existing at the upstream side of said flow sensing orifice to said first stage.

21. A valve system in accordance with claim 20 in which said housing is formed to define sixth, seventh, eighth and ninth passageways on the opposite side of said fourth passageway from, and as mirror images of, and complementary to, said third, first, second and fifth passageways, respectively, and in which said piston is formed to define third and fourth and which are mirror images of and complementary to said first and second lands and are connected by a similar additional reduced diameter portion and in which said piston is also formed to define an additional complementary flow sensing restrictor and an additional complementary plug, and in which said valve system includes an additional fluid outlet connection hydraulically connected to said sixth passageway.

22. A valve system in accordance with claim 2 in which said first valve stage includes a pilot housing formed to define a pilot hollow cylinder and also includes first and second pilot pistons disposed in said pilot cylinder.

23. A valve system in accordance with claim 22 in which said pilot housing and pistons are formed to define first and second pilot orifices and which includes first and second fixed restrictors, said first fixed restrictor and said first pilot orifice being serially connected between said inlet and said return connections and said second fixed restrictor and said second pilot orifice being serially connected between said inlet and said return connections the pressures at the junction of said first fixed restrictor and said first pilot orifice and at the junction of said second fixed restrictor and said second pilot orifice constituting said first and second fluid control pressures, respectively, said junctions being hydraulically connected to said means responsive, and a torque motor responsive to said input signal for actuating said pilot pistons so as to vary the sizes of said first and second pilot orifices simultaneously in opposite directions.

24. A valve system in accordance with claim 23 which includes fluid paths for applying the pressure existing on opposite sides of said flow sensing restrictor to opposite ends of said pilot cylinder, whereby the position of said pilot pistons is controlled jointly by said input signal and the pressure drop across said flow sensing restrictor.

* * * * *